Dec. 3, 1957   R. H. COLLINS   2,815,233
TWINE HOLDER FOR KNOTTING MECHANISM
Filed June 17, 1955   2 Sheets-Sheet 1

INVENTOR.
Robert H. Collins
BY
Cook and Schermerhorn
Attorneys

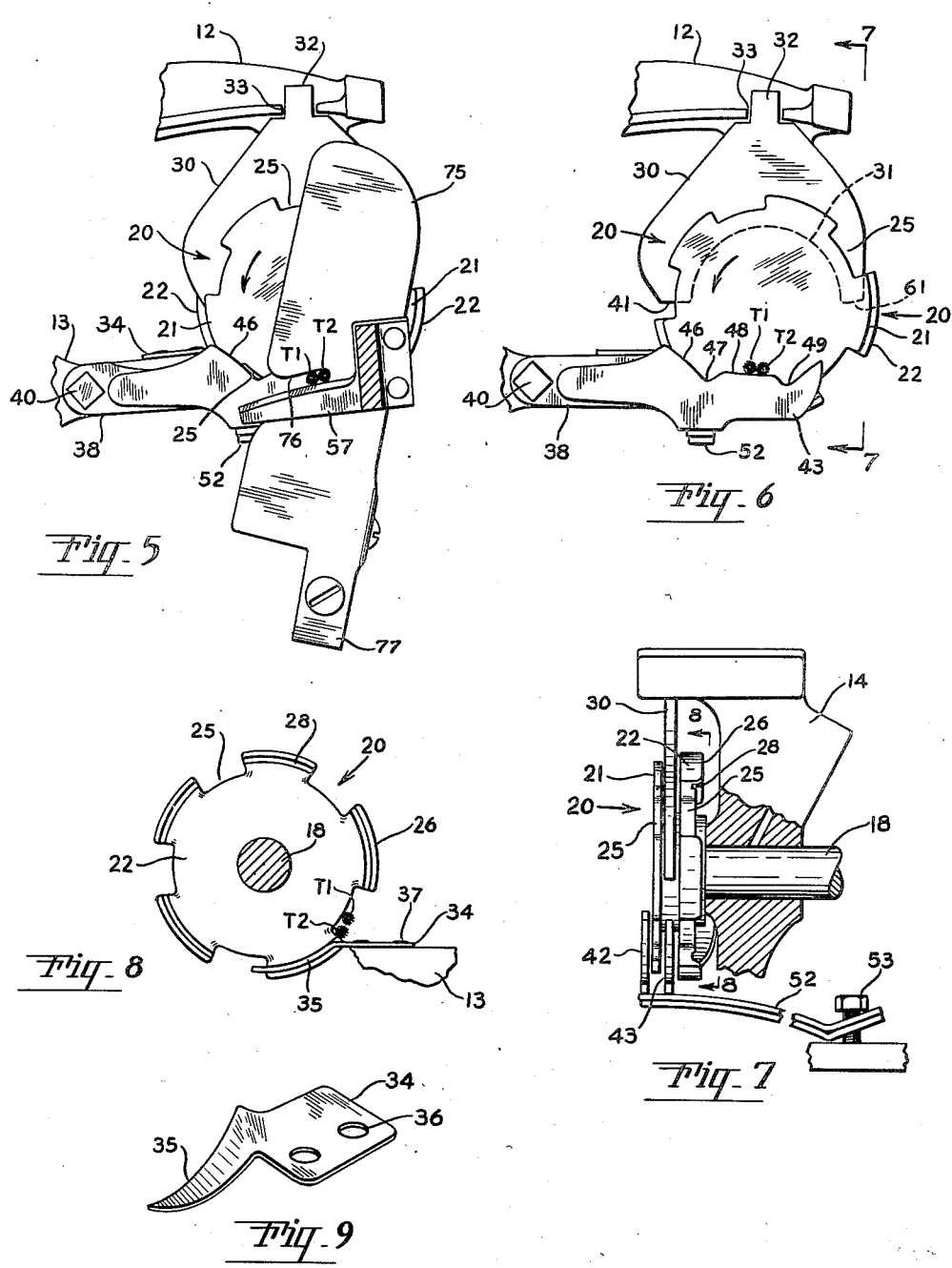

United States Patent Office 2,815,233
Patented Dec. 3, 1957

2,815,233

TWINE HOLDER FOR KNOTTING MECHANISM

Robert H. Collins, Brownsville, Oreg.

Application June 17, 1955, Serial No. 516,241

5 Claims. (Cl. 289—13)

This invention relates to improvements in twine knotting mechanisms for bailing machines and the like. This application is a continuation-in-part of application, Serial No. 412,268, filed February 24, 1954, for Knotter for Twine Baler.

Twine has been used for tying bales of grain for some time in the past and has certain advantages over wire ties. The most important advantage is that where it is desired to pass baled grain through a grinding mechanism the twine can be left on the bale and ground therewith. Wire ties must be removed from the bale before the bale is ground and there is, nevertheless, the possibility that some of the wire will pass through the grinder and cause serious injury to livestock consuming the grain.

While twine has the advantage described above, as well as advantages of economy and convenience in handling, difficulty has been experienced in providing knotting mechanisms which will tightly tie twine around a bale without damage to portions of the twine. When the twine has been damaged, the bales are likely to burst whereby costly delays are apt to occur in either the baling or transportation operations.

A principal object of the invention, therefore, is to provide a twine knotting mechanism having improved means for tying a tight bale without damage to critical portions of the twine around said bale.

A further object is to provide a twine knotting mechanism having an improved twine holding structure utilized in conjunction with a disc assembly for holding twine at predetermined tensions during a bailing operation, and for compressing one of a pair of twine strands more than the other strand during a twine cutting operation.

A further object is to provide a twine knotting mechanism having means positively to hold twine in a set position for cutting thereof by a movable knife blade.

Further objects are to provide improved means for directing twine into engagement with a disc assembly and to provide stripping means for removing a knot from bill hook means.

The above objects are accomplished by a knotter mechanism which coacts with conventional baler structure for holding twine under tension and for tying a knot in twine which encircles the bale. An improved twine holder mechanism is utilized in connection with a rotatable disc assembly for holding the twine at predetermined tensions while a knot is being tied therein and when the twine is being cut. Twine guard means are provided in conjunction with the disc assembly for guiding twine to be tied into positive engagement with the holder and disc. The knotter mechanism has bill hook means for tying a knot in the twine, and disposed between the bill hook and the disc assembly is a twine retaining or limiting plate which is used in conjunction with a movable knife structure for positively shearing the twine after a knotting operation. Means are also provided on the knife structure for stripping the knot from the bill hook after each knot tying operation.

The invention will be better understood and additional objects and advantages will become apparent from the following description taken in connection with the accompanying drawings which illustrate a preferred form of the invention. It is to be understood, however, that the invention may take other forms and that all such modifications and variations within the scope of the appended claims which will occur to persons skilled in the art are included in the invention.

In the drawings:

Figure 5 is a fragmentary elevational view of the knotter mechanism showing in detail the twine retaining plate for holding the twine during a severing operation thereof;

Figure 6 is a fragmentary elevational view showing the mounting arrangement of the disc assembly and twine holder;

Figure 7 is an end elevational view of the twine holder and disc assembly, taken on the line 7—7 of Figure 6, a portion of the knotter frame structure being broken away;

Figure 8 is a sectional view taken on the line 8—8 of Figure 7; and

Figure 9 is a perspective view of the twine guard.

Figures 1, 2, 3, 4:
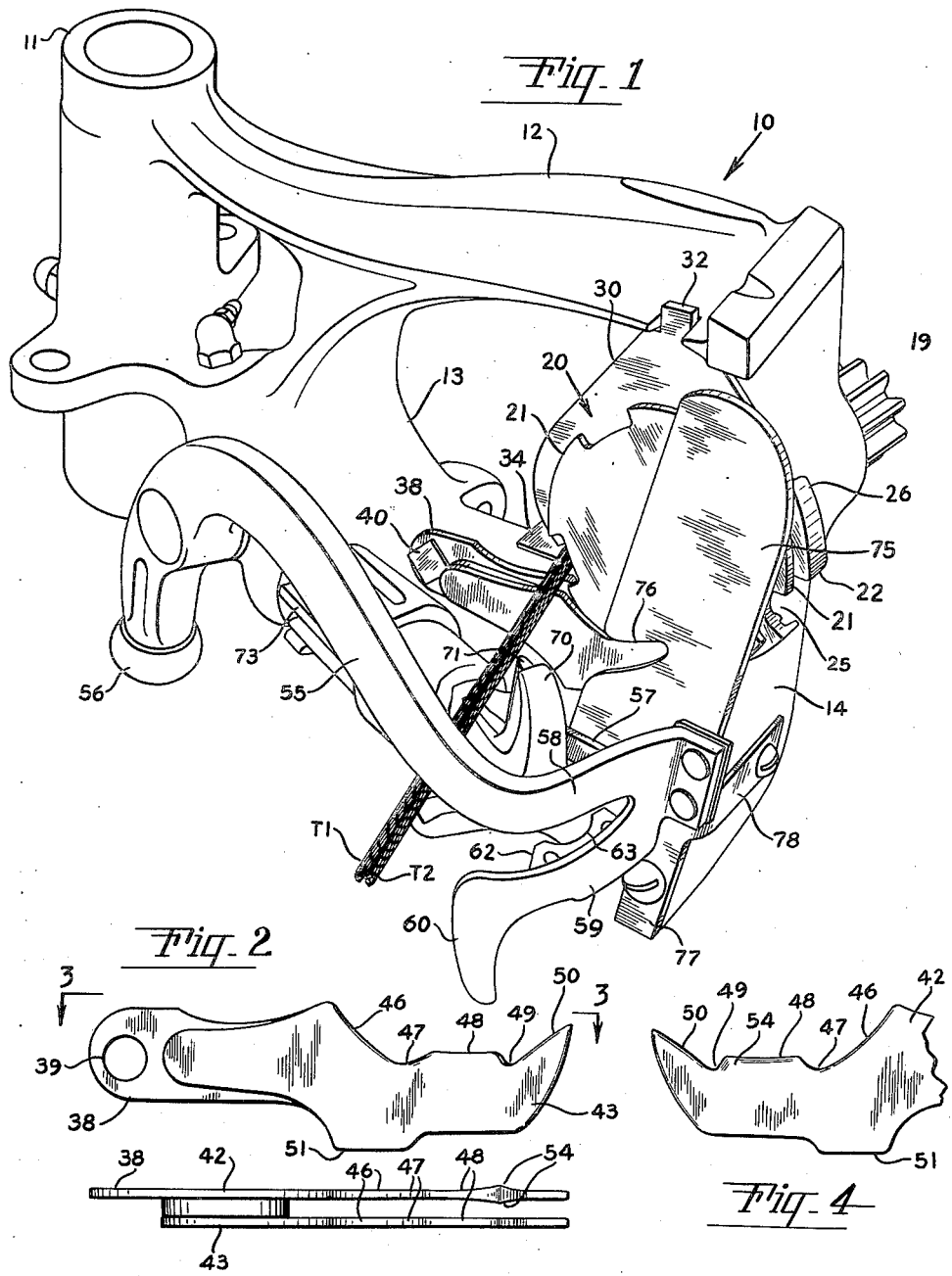
Figure 1 is a perspective view of the present improved knotter mechanism.
Figure 2 is a side elevational view of the twine holder used with the present knotter mechanism.
Figure 3 is an edge view of the twine holder taken on the line 3—3 of Figure 2.
Figure 4 is a fragmentary side elevational view of the opposite side of the twine holder shown in Figure 2.

Referring to Figure 1, the knotter mechanism comprises a cast frame member 10 having a collar 11 and arm portions 12 and 13 joined at their outer ends by an end wall 14. The knotter mechanism is mounted in place relative to the baler by means of the collar 11 which is mounted on a shaft, not shown. The frame member 10 is conventional structure, and the various movable parts thereof, to be described, are operated by other conventional baler structure for tying in a knot two strands of twine, designated by the reference characters T1 and T2.

Journaled in the end wall 14 of the frame member 10 is a shaft 18, Figure 7, carrying on one end thereof a pinion 19, Figure 1, and carrying on its opposite end a disc assembly 20 comprising a pair of integrally mounted spaced discs 21 and 22. The discs 21 and 22 have aligned peripheral notches 25 adapted to receive strands of twine therein during a baling operation. Disc 22 has a circumferential flange 26, Figure 7, projecting over one side thereof, this flange being interrupted by the notches 25. An annular groove 28, Figure 8, which is also interrupted by the notches 25, is provided in the side wall of the disc 22, the outer wall of the groove preferably being coextensive with the inner wall of the flange 26. The disc 22 is of thickened construction and the bottom surfaces of notches 25 are rounded to eliminate sharp or abrupt edges and thereby to prevent damage to twine tightly tensioned thereover. Disposed between the discs 21 and 22 is a cleaner plate 30 having a recessed portion 31, Figure 6, and having a shank portion 32 fitting in a slot 33 in the arm 12. Plate 30 prevents twine from accidentally being carried around between the discs 21 and 22 and has bottom edge portions 41 and 61. Edge portion 41 assists in guiding the twine into the notches of the discs before a knotting operation and edge portion 61 insures removal of cut ends of the twine from the notches after a knot has been tied.

Referring specifically to Figures 8 and 9, there is shown a twine guard 34 having an arcuate arm portion 35. The radius of curvature of arm 35 is identical to the radius of curvature of the disc groove 28 and in assembled relation of the parts, this arm rides in groove 28, the guard 34 having apertures 36 and being secured to arm 13 of the frame member 10 by screws 37 mounted in aperture 36. Guard 34 serves the function of positively guiding twine into a notch 25 when the needle lays the twine in place in an initial step of a knotting operation.

Pivotally mounted on the arm 13 of the frame member 10 is a twine holder 38, shown in detail in Figures 2, 3 and 4. The twine holder 38 has an aperture 39 on one end and is pivotally mounted on arm 13 by a pin 40. Twine holder 38 comprises a pair of spaced arms 42 and 43 adapted to be disposed on opposite sides of the disc 21. The edge portions of arms 42 and 43 are substantially identically contoured as shown in Figure 2, the upper edges thereof having an inclined portion 46 terminating in a notch 47, a substantially flat portion 48, a notch 49 and end portions 50. The opposite or bottom edges of the arms are provided with projecting portions 51 which form abutment means for a leaf spring 52, Figure 7, which bears thereagainst and urges the twine holder upwardly into engagement with the disc assembly. The spring 52 has suitable tension adjusting means 53 for varying the upward force applied to the twine holder 38.

Arm 42 is thickened adjacent the front of the flat edge portion 48 to provide oppositely disposed projections or protuberances 54 which cooperate with the discs 21 and 22 to hold the twine in a stationary position at a certain time in the knotting operation.

Pivotally mounted on the supporting frame 10 is a knife arm 55 having on one end a roller 56 and having on its opposite end a knife blade 57. The end of arm 55 carrying the knife blade 57 comprises bifurcated arms 58 and 59, the arm 59 terminating in an angular finger portion 60. Arm 59 has secured thereto a stripper member 62 having an arcuate notch 63 therein.

A bill hook 70, Figure 1, is disposed between the knife arm 55 and the disc assembly 20 and has a pivotal finger portion 71 which is operable relative to the bill hook by suitable mechanism, not shown. The bill hook is rotatably mounted in the frame member 10 and has an integral pinion 73 operable by suitable mechanism for imparting rotary motion thereto. The bill hook is adapted to engage twine ties and by rotary motion thereof, together with manipulative movements of the finger portion 71, a knot is formed thereby.

Disposed between the bill hook 70 and the disc assembly 20 is a twine retaining or holding plate 75 having an angular notch 76 in one edge thereof. The plate 75 has a bottom extension 77 and a right angular arm 78 for securing the plate 75 on the end wall 14 of the frame 12, as best seen in Figures 1 and 5. The plate 75 is mounted on the frame 12 so as to be closely adjacent and parallel to the knife 57 traveling a distance sufficient to pass the notch 76. The notch 76 is angularly disposed relative to the line of travel of the knife so that the knife, as it engages the twine, will urge it toward the bottom of the notch. The twine is thereby trapped in the notch and a positive cutting action is insured. Although, as shown, the notch 76 is inclined upwardly relative to the edge of the plate 75, it may be disposed in different angular positions relative to said edge, depending on the angular position of plate 75 relative to the line of travel of knife 57.

The conventional baler utilizes a needle which lays twine in a position relative to the knotter assembly so that the twine will be engaged and knotted upon the proper functioning of the knotter parts. The needle is adapted to lay the twine in one of the disc notches 25, and the twine guard 34 insures positive engagement of the twine therein to insure against splitting of the twine. In assembled position of the twine holder 38 and the disc assembly 20, the edge portions 46 of the arms 42 and 43 are substantially coplanar with the line of travel of the bottom wall of notches 25, Figure 5. Adjustment of the parts is made such that a small space exists between the edges 46 and the bottom of notches 25, whereby when the twine is contained in a notch 25 and that notch is adjacent the edges 46, the twine will not be tightly compressed between the arms of twine holder 38 and the discs 21 and 22 and, therefore, may slide longitudinally if necessary. However, when the twine is moved into engagement with the horizontal or flat portion 48 of arms 42 and 43, it is tightly compressed and held in non-slidable relation. This position of the parts is assumed as the twine is being cut.

The strand of twine, designated by the reference character T1, is carried in the needle and comes from a source of twine supply, not shown, but the strand, designated by T2, terminates in an end portion which was cut by the previous knotting operation. This end portion projects a few inches on the side of the disc assembly away from the observer in Figure 1. As the strand T2 is quite short it can unravel somewhat and flatten out when moving around with the notch 25. In this flattened condition the strand may not be tightly compressed between the disc and twine holder, and it may, therefore, slide out of engagement therewith to ruin a tie around the bale. This disadvantage is obviated by the structure of the arm 42 of the twine holder and more specifically by the cooperation between protuberances 54 thereof and the discs 21 and 22 in that when the parts are in the Figure 6 position, which is the position thereof when the twine is being cut, the strand T2 is compressed between the protuberance 54 and the discs and is held positively in a set position. The portion of strand T2 which is engaged by the protuberances 54 may be slightly damaged, but this end of the strand will be sheared off by the knife 57 and drops out of the disc assembly upon rotation of the disc assembly 20 in the next knotting operation. The strand T1 in the subsequent knotting operation will comprise the short end and will be cut off in the knotting operation; therefore, if the strand T1 should be damaged by passing over the protuberances 54, no impairment of the bale tie is present because this portion of the twine is not tied around the bale.

When a bale has been formed and a knot is being tied in the twine, the two strands of twine are disposed across the inclined edges 46 of the twine holder whereby the necessary slack for tying a knot can be drawn through the disc assembly. After the knot is formed, the disc assembly rotates slightly to move the strands T1 and T2 into engagement with edges 48 of the twine holder with the strand T2 being engaged by protuberances 54. Rotation of the disc assembly in the knot forming operation moves the twine strands into the slot 76 of the holder plate 75 and the knife arm 55 is then rotated and the knife blade 57 travels upwardly to cut the strands of twine. As the strands T1 and T2 are positively held against longitudinal movement and are entrapped in slot 76, a positive cutting operation is insured and no mis-ties will result on this account. Upon completion of the cutting operation, the baler needle lays strands of twine in the following pair of notches 25 and, as the disc assembly rotates for the next knot tying operation, the short end of strand T2 will drop out of the assembly.

The stripper plate 62 moves over the bill hook 70 in close proximity thereto for positively removing the knot therefrom after the knife has severed the strands of twine.

The present invention, therefore, provides an improved knotter mechanism which reduces to a minimum the number of bale mis-ties caused by damaged twine or by a failure of the knife to cut the twine after a knotting operation. Costly delays are substantially eliminated and in addition a minimum of wear occurs to the parts due to the arrangement and cooperation described.

Having now described my invention and in what manner the same may be used, what I claim as new and desire to protect by Letters Patent is:

1. In a twine knotter mechanism for grain balers and the like, a rotatable disc having notches therein arranged to receive twine and carry said twine therewith upon rotation of said disc, a twine holder comprising at least one arm disposed in proximity to said disc for compressing twine therebetween, said arm having a lateral projection to increase the compressive force on said twine at a selected time in a bale forming operation to prevent axial movement thereof.

2. In a twine knotter mechanism for grain balers and the like, a rotatable disc having notches therein arranged to receive a pair of twine strands in side by side relation and carry said twine strands therewith upon rotation of said disc, a twine holder comprising at least one arm disposed in proximity to said disc for compressing twine therebetween, said arm having a lateral projection to increase the compressive force on one of said twine strands at a predetermined position of said disc relative to said twine holder.

3. In a twine knotter mechanism, a rotatable disc having notches in its peripheral edge for receiving twine and moving said twine in an arcuate path, a twine guard engaging said disc for guiding twine into said notches, a twine holder operative in a first rotative position of said disc to permit longitudinal sliding movement of said twine in said notches and being operative in a second rotative position of said disc to prevent longitudinal sliding movement of said twine, a plate member having a slot in the plane of said arcuate path for receiving said twine in said second position of said disc, knot tying means operative on said twine in said first position of said disc, and a knife movable across said slot for severing said twine in the second position of said disc.

4. In a twine knotter mechanism, a rotatable disc having notches in its peripheral edge for receiving twine and moving said twine in an arcuate path, a twine guard engaging said disc for guiding twine into said notches, a twine holder spring pressed in a direction toward said disc and engaging twine in said notches, a lateral projection intermediate the ends of said twine holder, said disc having a first rotative position relative to said twine holder wherein said twine is free of said projection so as to move axially and said disc having a second rotative position wherein said twine is in compressed engagement with said projection so as to be held against axial movement, a plate member having a slot in the plane of said arcuate path for receiving said twine in said second position of said disc, knot tying means operative on said twine in said first position of said disc, and a knife movable across said slot for severing said twine in the second position of said disc.

5. In a twine knotter mechanism for grain balers and the like, a rotatable disc assembly comprising a pair of spaced disc plates having aligned peripheral notches arranged to receive a pair of twine strands in side by side relation and carry said twine strands therewith upon rotation of said disc assembly, a twine holder having a pair of arms for compressing twine against said disc, one of said arms being disposed between said disc plates and having oppositely directed projections for increasing the compression on one strand of said twine at a selected time in a bale forming operation to prevent axial movement thereof.

References Cited in the file of this patent

UNITED STATES PATENTS

| | | |
|---|---|---|
| 221,627 | Storle | Nov. 11, 1879 |
| 378,815 | Whiteley | Feb. 28, 1888 |
| 2,628,856 | England | Feb. 17, 1953 |
| 2,670,978 | Rudeen | Mar. 2, 1954 |

FOREIGN PATENTS

| | | |
|---|---|---|
| 193,703 | France | Oct. 24, 1888 |
| 457,837 | Germany | Mar. 24, 1928 |